July 1, 1969  G. A. DOTTO  3,453,492
CAPACITOR DISCHARGE IGNITION SYSTEM
Filed June 5, 1967  Sheet 1 of 2

INVENTOR.
GIANNI A. DOTTO
BY
Woodard, Weikart, Emhardt & Naughton
Attorneys

INVENTOR.
GIANNI A. DOTTO

United States Patent Office 3,453,492
Patented July 1, 1969

3,453,492
CAPACITOR DISCHARGE IGNITION SYSTEM
Gianni A. Dotto, 3005 Claar Ave.,
Dayton, Ohio 45429
Filed June 5, 1967, Ser. No. 643,691
Int. Cl. H05b 41/04
U.S. Cl. 315—209                    14 Claims

ABSTRACT OF THE DISCLOSURE

A capacitor discharge ignition system with: a single-transistor blocking oscillator charging a capacitor and incorporating a non-saturable reactor; a timer employing breaker points, rotary capacitor, or rotary magnetic pulse generator with or without a unijunction transistor to control a switching circuit by triggering a silicon controlled rectifier (SCR) for discharge of the capacitor through the primary of an ignition coil; with a core saturating circuit supplied by said oscillator between capacitor discharge events.

BACKGROUND OF THE INVENTION

This invention relates to an improved capacitor discharge ignition system.

The idea of producing a spark by discharging the capacitor across a conventional automotive ignition coil is well known. Normally a DC to AC, two-transistor converter charges a capacitor up to the desired voltage. A thyratron or some other semi-conductor is then triggered to discharge the energy stored in the capacitor across the primary winding of an automotive coil. In such a DC to AC converter, when the resistance load across the secondary output winding is in short circuit, (for example, every time the capacitor is discharged across the resistance load) the oscillatory frequency of the converter is interrupted, and a complicated circuit must be used to protect the second transistor from the negative voltage produced during the capacitor discharge operation while one transistor is in a non-conductive state. The present invention overcomes the need for a complicated circuit and avoids the misfiring or false triggering found in conventional ignition systems.

SUMMARY

One embodiment of the capacitor discharge ignition system of the present invention uses a blocking oscillator system employing a non-saturable reactor and a single high-voltage power transistor, with a full wave bridge rectifier, supplying power to charge the capacitor. A controlled rectifier is used for discharge of the capacitor through the ignition coil primary and control of the rectifier is provided by breaker points or other engine driven means through a unijunction transistor and second capacitor. Controlled discharge of the second capacitor is provided to prevent spurious signals from triggering the rectifier and thus avoid misfiring and false triggering which might otherwise be caused by breaker point bouncing. Existing parts of conventional ignition system can be employed as functional parts with the novel electronic circuitry, so that in case of an emergency, a simple turnover switch can change the electronic ignition system to a conventional ignition system or vice versa. The circuit of the present invention insures the blocking and quick starting of the converter during the resistance load short circuit. While the circuit is greatly simplified over prior art circuits, it produces an extremely efficient and yet economical system.

DESCRIPTION OF THE PREFERRED EMBODIMENTS

Figure 1:
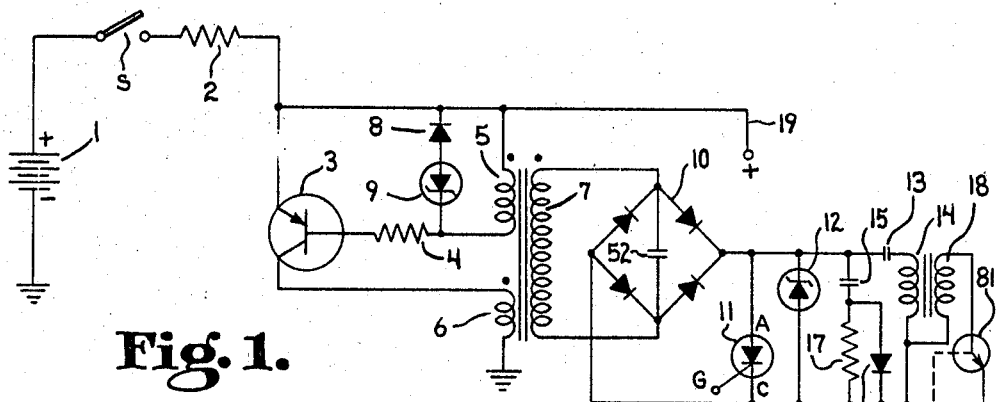
FIG. 1 is an electrical schematic of one embodiment of the power supply and switching circuit of my ignition system.

Referring more specifically to FIG. 1, the battery 1 is connected directly to the emitter of the PNP transistor 3 through the ignition switch S and ballast resistor 2, and through feed back winding 5 and current limiting resistor 4 to the base of the transistor 3. The collector of the transistor is connected through primary winding 6 to the ground or negative side of the battery. When the switch S is turned on by the ignition key, the base of the transistor is driven more negative than the emitter. The transistor 3 is then instantaneously triggered on and current flows from the collector to the primary winding 6. Since the primary winding 6 and the feed back winding 5 are wound on the same core of the transformer shown in FIG. 4, by induction, effects the feed back winding 5 maintains the base of the transistor more negative than the emitter so that a conductive state is maintained.

Figures 2, 3, 4:
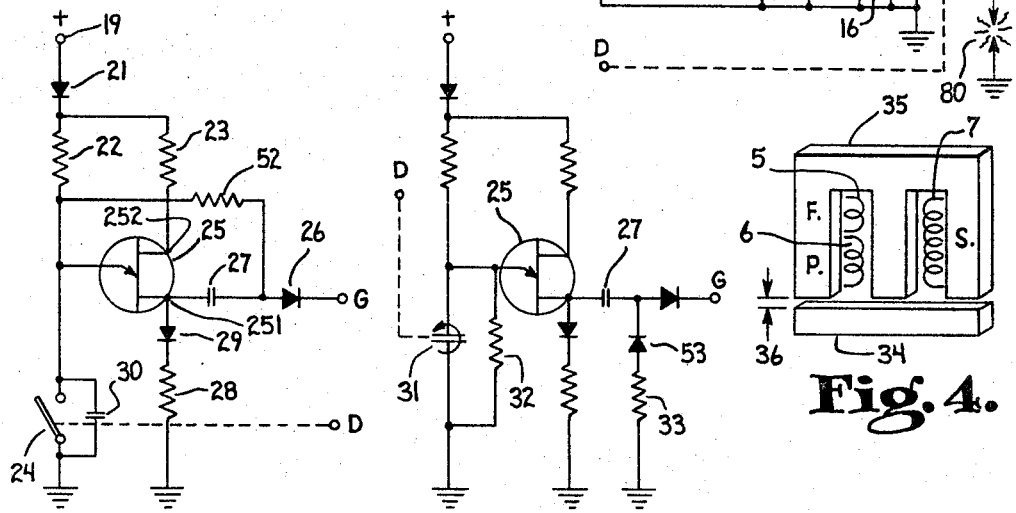
FIG. 2 is an electrical schematic of one embodiment of the timing circuit using conventional breaker points and a unijunction transistor.
FIG. 3 is a second embodiment of the timing circuit using a rotary capacitor and unijunction transistor.
FIG. 4 is a mechanical schematic diagram of the pulse transformer utilized in the blocking oscillator of the power supply circuit.

Contrary to a standard design square wave converter, where a very efficient saturating core transformer is used, the transformer of the converter described in this invention and shown in FIG. 4 is made of a stack of E-type conventional iron laminations 35 and I-type conventional iron laminations 34. The E-type laminations are stacked together as are the I-type laminations. The transformer laminations are assembled in such a way so that a gap 36 is maintained between the two types of laminations to produce a choke-type winding transformer better known as a non-saturable reactor.

By maintaining the gap and utilizing a non-saturable reactor, when transistor 3 is turned on, current flows across the primary winding 6. At the same time, an EMF is produced in the iron core of the transformer, but in the opposite direction because of the non-saturable reactor design.

This produces a momentary oscillation in the transformer commonly present in the choke type transformer. Consequently a pulse is produced because of the polarity opposite normal flow of current. Since the feed back winding 5 is wound on the same core and the direction of the primary winding 6, the base of the transistor is driven more positive than the emitter, thus shutting off the transistor conductivity.

When the flow of electricity through the transistor 3 is thus stopped the energy stored in the iron core transformer, because of the open core reactor, collapses, raising the voltage of the primary winding 6 three or more times the voltage battery source. This voltage raising effect is proportional to the mass of the iron core and the distance gap 36 between the E-type and the I-type laminations.

The increase of the voltage in the secondary winding 7 is proportional to the resistance load formed by capacitor 13 and primary winding 14, or the voltage level rise with the charging level of the capacitor 13. To insure a quick starting or blocking effect and to maintain the efficiency of the single transistor oscillator, the turns ratio of the feed back winding 5 with respect to primary winding 6 is approximately 4 to 1, contrary to normal design practice. In this condition, when the base of transistor 3 is driven more positive than the emitter, the conductivity of the transistor is shut off with the instantaneous effect of producing a damping effect in the iron core 5, 6, 7. The blocking state of the transistor during the rising of voltage in the reverse cycle is more efficient than the prior art methods.

The voltage between the base and emitter will be approximately four times greater than the voltage at the collector. In this condition, the blocking of flow of current between the collector and emitter is more efficient than typical prior art. The same effect, of course, is present during the short circuit of the load produced by the firing of SCR 11 and the discharging of the capacitor across the primary winding 14. To protect the transistor from base-emitter voltages over the transistor rating and specifications, diode 8 and Zener 9 bypass any voltage over the desired level.

From primary winding 6, the voltage is induced to the secondary winding 7 and rectified by bridge 10, thereby charging the capacitor 13 to the desired voltage level. The value of resistor 4 not only limits the current flow to the base of the transistor 3 to obtain the proper gain, but also controls the frequency of the oscillator. If desired to use a lower value Zener diode at 9, it can be connected directly to the transistor base rather than to winding 5.

Since the voltage output from the primary winding 6 is a result of the damping effect of the non-saturable reactor transformer shown in FIG. 4, at a level value of three or more times, the voltage of the battery source, depending on the resistance load, the turns ratio between the primary winding 6 and the secondary winding 7 is maintained relatively low to obtain the desired voltage level at capacitor 13. Thus, if the battery source is 12 volts, the output of the primary winding is three or more times 12 volts. Consequently, the current level in the capacitor 13 with the circuit of the present invention will be three or more times greater than it would be for the same voltage if an efficient saturating core transformer had been used conventionally where the voltage in the primary winding is always equal to the battery voltage source minus transformer losses.

The voltage output is proportional to the resistance load, and the more capacitor 13 is charged, the more the voltage across the secondary winding 7 is increased. To protect SCR 11 from voltages greatly exceeding the forward blocking voltage level across SCR 11, especially during cranking and engine idle speed, a high current Zener diode 12, commonly known as a thyrector, is connected across the resistance load. The thyrector 12 has the function of protecting the SCR 11 from over voltage in one direction, and in the opposite direction to insure the proper charging polarity of capacitor 13 using the excess energy remaining as negative voltage after the spark occurs.

The AC output of the secondary winding 7 is rectified by bridge 10 and smoothed in the conventional way by capacitor 52, capacitor 15, resistor 17, and diode 16. To insure a full charge of capacitor 13 at high engine r.p.m., the voltage output from bridge 10 is maintained approximately 35% greater than the desired voltage level of capacitor 13. In this condition the value of microfarads of capacitor 13 can be two or more times the value of a conventional capacitor discharge ignition system. Consequently, the current available at the spark plug will always be more than required for any type of internal combustion engine.

At a predetermined time, a pulse controlled by the engine distributor and timing circuit described in FIGURES 2, 3, 5 and 6, is created to trigger the gate G of the SCR 11 and to create a conductivity stage of the semiconductor. At this point, the charge accumulated in the capacitor 13 abruptly discharges through the SCR 11 and the coil primary 14.

The current flowing in the coil primary 14 induces a high voltage in the coil secondary 18 by transformer action. This high voltage pulse is fed to the proper spark plug 80 via the conventional engine distributor 81. Because capacitor 13 and the primary inductance of the ignition coil 14 form a second, much higher frequency, oscillatory circuit, capacitor 13 overswings in voltage and this reverse voltage turns off the SCR 11. Any excess energy remaining as negative voltage on capacitor 13 is fed back via the coil primary 14 and thyrector 12 to charge capacitor 13 in the forward direction once again. Resistor 17, capacitor 15 and diode 16 limit the rate of rise of voltage across the SCR 11 within safe limits.

Referring to the timing circuit shown in FIG. 2, distributor breaker point 24 is a part of the distributor 81 of FIG. 1 for synchronization therewith as indicated by the dotted line D. When the distributor breaker point 24 opens, current flows from the positive battery terminal 19 through diode 21, resistor 22 and the negative (ground) side of the battery, charging capacitor 30 of the conventional engine distributor up to the firing voltage of the unijunction transistor 25. Transient current then flows from the transistor base 251 through capacitor 27 and diode 26 and gate G of the SCR 11 up to the charge of capacitor 27 to trigger the SCR.

When the extended foil capacitor 27 is charged, no more current will flow in the direction of the SCR 11 and any excess current coming from the unijunction transistor 25 will drain through diode 29 and resistor 28 to ground. Thus, during the opening of the breaker point 24, only one pulse of current will reach the gate G of the SCR 11 and no accidental pulse by point misfiring will retrigger the SCR 11 while capacitor 27 remains charged.

Diodes 26 and 29 prevent recharging of capacitor 27 in the opposite direction during the negative half cycle necessary to close SCR 11, and at the same time, create a blocking gate status to prevent a negative gate leakage which in turn prevents refiring of the SCR 11.

When the breaker point 24 closes, capacitor 30 discharges through the breaker point to ground. Capacitor 27 discharges through diode 29, and resistor 28. Capacitor 30 discharges immediately while capacitor 27 discharges more slowly. Resistor 52 is of a high resistance value (more than 20K ohms) to insure a slow rate of discharge of capacitor 27. In this condition the breaker point 24 must be maintained closed for a relatively long period (more than 0.002 second) to insure the discharge of capacitor 27 to a level low enough for the SCR to turn off and permit a new cycle to begin. Consequently, any misfiring by bouncing of the breaker point is prevented. Resistor 23 provides a proper bias to base 252 of unijunction transistor 25, and only a low current is needed to be interrupted by breaker point 24 (0.145 milliamp. max., for example).

Referring to FIG. 3, the circuit is similar to the one described in FIG. 2. The performance and function occurs in the same manner except that the distributor point and capacitor 30 are replaced by a rotary capacitor apparatus 31 as disclosed in my Patent No. 3,217,216, issued Nov. 9, 1965. When the rotary capacitor 31 reaches the maximum microfarad value, enough voltage is charged across the capacitor to trigger the unijunction transistor 25, and the same conditions are produced as described in FIG. 2. Resistor 32 is to discharge rotary capacitor 31, and resistor 33 and diode 53 serve to slowly discharge capacitor 27.

Figures 5, 6:
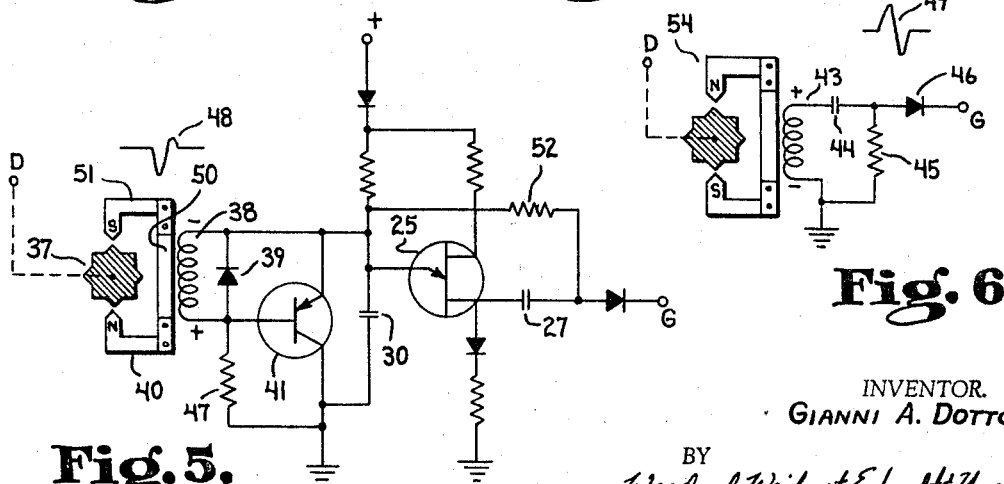
FIG. 5 is an electrical schematic of still a further embodiment of the timing circuit using a magnetic pulse generator and two transistors.
FIG. 6 is a further embodiment of the timing circuit using a pulse generator without transistors.

Referring to FIG. 5, the circuit is smaller to the one described in FIG. 2 with the exception that the breaker point 24 is replaced by transistor 41. Transistor 41 biased by coil 38 and resistor 47, is normally in a conductive state so no charge will appear across the capacitor 30 to fire the unijunction transistor 25. Elements 51, 40 and core 50 form a permanent magnet with a polarity as shown in FIG. 5.

The rotor distributor 37 is a stack of laminations, or powdered iron composition in the form of gear teeth as shown, rotatable on an axis perpendicular to the paper. The purpose of the rotor is to alternatively open and close the magnetic field of the permanent magnet.

When the magnetic field is open, the magnet and coil provide an open core reactor and coil 38 provides the proper polarity of emitter-base bias of transistor 41 to keep it turned on. At the same time, energy is stored in the iron core 50. When the magnetic field is closed (that is when the rotor teeth are in line with the N-S poles of the permanent magnet), an EMF is produced in a direction opposite to the original iron charged to force the iron core to collapse, thereby releasing a voltage pulse on the opposite direction as shown by the polarity signs + and − on FIG. 5. Accordingly the base of transistor 41 is driven more positive than the emitter, and the transistor is momentarily rendered non-conductive. This interruption is sufficient for capacitor 30 to charge and trigger unijunction transistor 25, and the same sequence of events occurs as described in FIG. 2. Diode 39 is provided to clamp the coil 38 to prevent it from going into oscillation.

With reference to FIG. 6, transformer 54 performs in the same manner as described in FIG. 5, except the EMF produced at the closing of the magnet field is coupled directly through capacitor 44 and diode 46 to the gate terminal G of SCR 11 to trigger it. Capacitor 44 is discharged then through coil 43 and resistor 45. Diode 46 is to clamp the gate of the SCR 11.

The advantage of the capacitor discharge ignition system over the conventional system is evident. The ignition system of the present invention releases more than twice the energy released by conventional ignition system in one sixth of the time. Over ten kilovolts additional ignition reserve is available under all conditions, and with the battery voltage as low as three volts. A more rapid voltage rise time of the capacitor discharge ignition system maintains a higher available voltage despite shunt loading. Peak voltage is reached in 35 mircroseconds rather than the 125 microseconds of the standard systems. The spark duration is reduced from 1500 to 300 microseconds.

Figure 8:
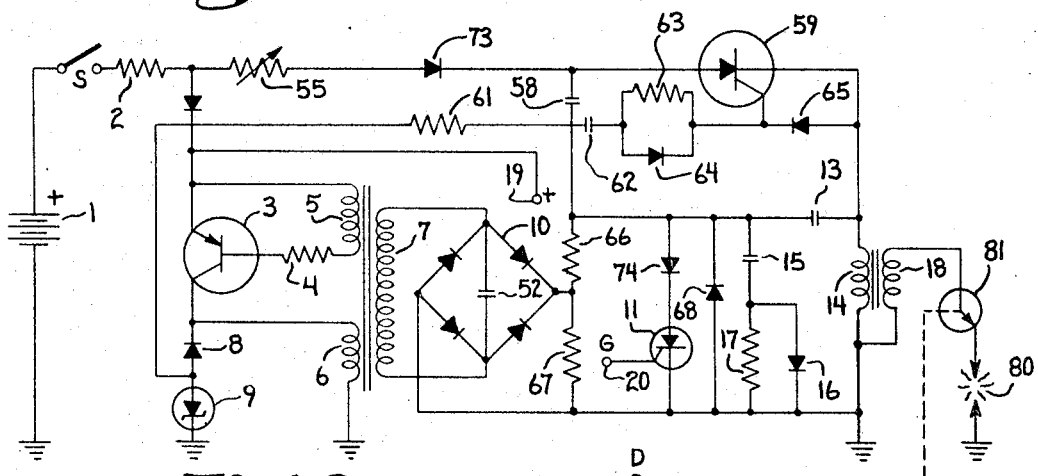
FIG. 8 is similar to FIG. 7 with a variation of the saturating circuitry.
Figure 9:
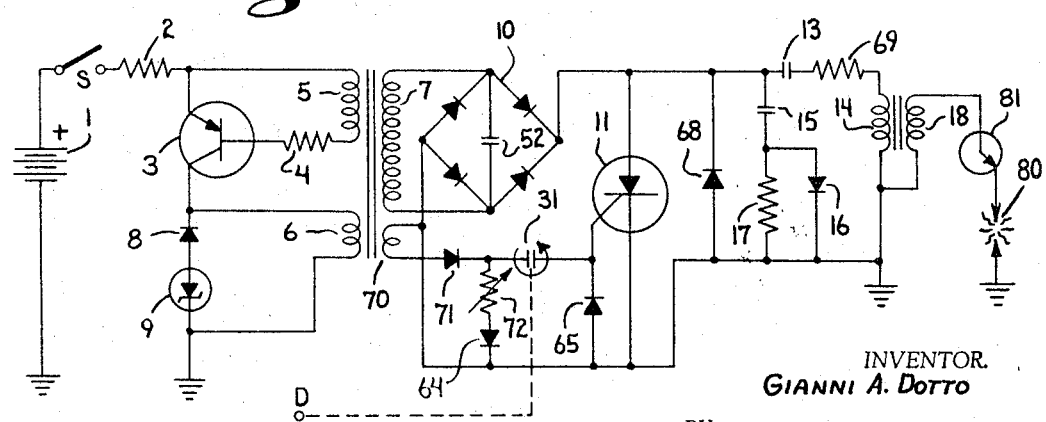
FIG. 9 is similar to FIG. 1 but employs rotary capacitor timing means in circuit with an auxiliary winding of the blocking oscillator for control of the switching.

While the above features greatly improve the performance of seventy five precent of the internal combustion engines, additional features may be required for particular high performance engines or certain precombustion engines. To reduce and minimize the emissions at the exhaust of those types of engines, and generally of most types of engines, the nominal secondary rise time must be maintained at no more than 35 microseconds, however the spark duration must be maintained over 1.5 milliseconds. The systems shown in FIGURES 7 through 9 are illustrative of embodiments which meet these requirements.

Figure 7:
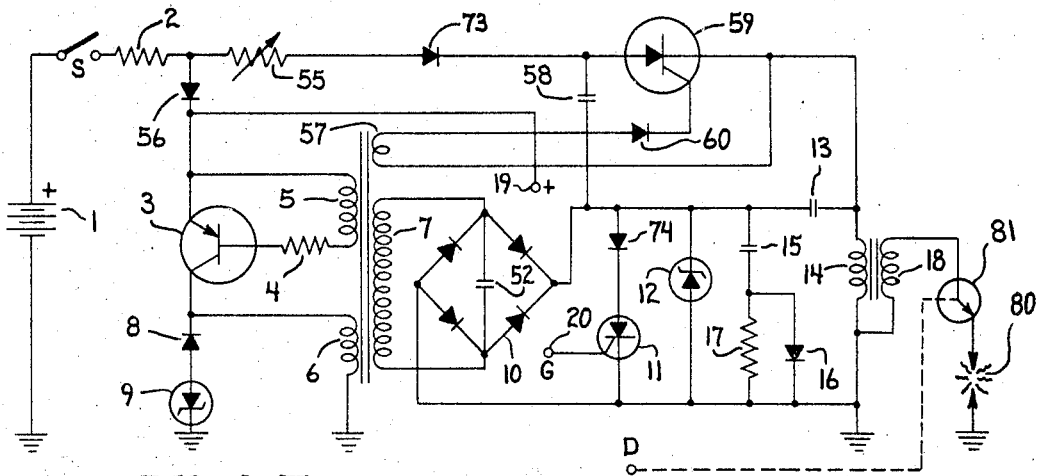
FIG. 7 is another embodiment of the power supply and switching circuit, with ignition core saturating circuitry.

With reference to FIGURE 7, the diagram is similar to the one described in FIGURE 1. The blocking oscillator converts the battery DC voltage to a high AC voltage which is passed through the bridge 10 and reconverted to DC voltage to charge the capacitor 13. At the same time, the SCR 59 is triggered by the pulse transformer 57. The current then flows from the battery through the ballast resistor 2, the balance variable resistor 55, and the SCR 59, through the winding 14 of the ignition coil to saturate the iron of the coil.

A second capacitor 58 and SCR 59 are in parallel with capacitor 13. When the SCR 11 is triggered, capacitors 13 and 58 discharge across the primary winding of the ignition coil 14. At least fifty percent discharge of capacitor 58 backward through SCR 59 is possible because recovery time by reverse voltage of the conventional SCR is about twelve microseconds. Coil 14 is thereby driven to zero and the energy released from the capacitors and from the iron core of the coil is added. In this condition, the rise time of the secondary voltage is equal to the time constant of the discharging of the capacitors 58 and 13 (25 to 35 microseconds), but the duration of the spark is greater because it is the resultant of the summation of the energy in capacitors and energy released by the iron core during the damping effect or practically two or two and a half milliseconds.

SCR 59 is shut off by this discharge of the capacitor 58 and rising voltage in the opposite direction by the collapsing of the field in coil 14, while the SCR 11 is shut off in the same manner as described in FIGURE 1 with the exception that the backward voltage will be much greater than the forward voltage so diode 74 is added in series with SCR 11 to protect SCR 11 from the reverse surge due to the phenomenon described above. During the discharge of capacitors 13 and 58, the blocking oscillation of transistor 3 stops, because of the short circuit of the resistance load. After the entire energy is released via spark plug and SCR 11 and 59 are closed, the blocking oscillator starts again for the new cycle. A new pulse from winding 57 which is wound in the same iron core on the blocking oscillator transformer, triggers SCR 59 and the cycle start all over again.

Diode 8 and Zener diode 9 clamp the voltage of the primary 6 to control the charging voltage level of capacitors 13 and 58. Diodes 56 and 73 prevent the discharging or charging of the capacitors 13 and 58 via transistor 3. Diode 60 is to insure proper polarity to the gate of the SCR 59.

Referring to FIGURE 8, the performance is similar to the one described in FIGURE 7 with the exception that the SCR 59 is triggered when the voltage in the primary 6 reaches the level of the Zener diode 9. In this condition, more recovery time is insured for the SCR 59. The resistor 61 limits the current to the capacitor 62, while diode 64 and resistor 63 insures one single pulse to the gate of the SCR 59. The diode 65 clamps the gate of the SCR 59 and slow discharge of capacitor 62 is provided via resistor 63. The resistors 66 and 67 are voltage dividers which insure a constant voltage level of capacitors 13 and 58 at any engine r.p.m.

Referring to FIGURE 9, the performance is similar to the one described in FIGURE 1 with the exception that the resistor 69 is added to protect the SCR 11 from the back voltage and to maintain more energy in the primary winding 14 and insure longer discharging time constant of capacitor 13.

Diode 8 and Zener diode 9 clamp the voltage across the primary winding 6 instead of feed back 5, to control a free running voltage level of the blocking oscillator. The pulse transformer 70 constantly sends triggering signals to the gates of the SCR 11 but SCR 11 switches on only when the distributor rotary capacitor 31 (see my Patent No. 3,217,216) reaches sufficient capacitance value to accumulate the necessary energy to trigger the SCR 11.

The variable resistor 72 is set to control a constant timing of rotary capacitor 31. Diodes 65 and 64 clamp the gate of SCR 11 and discharge rotary capacitor 31 after SCR 11 is shut off. Since the voltage rise of the capacitor 13 is controlled by the clamping of the primary 6, diode 68 on FIGURES 8 and 9 replace the thyrector of FIGURES 1 and 7.

While the invention has been disclosed and described in some detail in the drawings and foregoing description, they are to be considered as illustrative and not restrictive in character, as other modifications may readily suggest themselves to persons skilled in this art and within the broad scope of the invention, reference being made to the appended claims.

The invention claimed is:
1. In an ignition system, the combination comprising:
a source of electrical energy;
a blocking oscillator coupled to said source, said oscillator including a transistor, a non-saturable reactor with a primary winding in the collector circuit a feedback winding in the base circuit, and a secondary winding,
an ignition coil having primary and secondary windings,
first rectifier means and a charge storage device coupled between said reactor secondary winding and said coil primary winding to build up a charge on said storage device during oscillation of said oscillator,
a normally non-conducting controlled rectifier coupled in a discharge path for said storage device, said controlled rectifier including a control signal input,
and timing means coupled to said signal input and periodically gating said controlled rectifier into conduction to discharge said storage device through said coil primary winding to induce a high voltage pulse in said coil secondary winding.

2. The combination of claim 1 wherein:
the turns ratio of said feedback winding to said reactor primary winding is approximately four to one.

3. The combination of claim 1 wherein said reactor includes:
a three-legged E-shaped laminated iron core and an I-shaped laminated iron core associated therewith, said I-shaped core being spaced from legs of said E-shaped core, thus providing a non-ferrous gap therebetween.

4. The combination of claim 3 wherein:
said reactor primary and feedback windings are wound one one leg and said reactor secondary winding is wound on another leg of said core.

5. The combination of claim 1 and further comprising:
a core in said ignition coil;
a second normally non-conducting controlled rectifier coupled between said energy source and said coil primary winding, said second controlled rectifier including a control signal input;
and gating signal output means in said blocking oscillator and coupled to said control signal input of said second controlled rectifier for gating said second controlled rectifier into conduction in synchronism with the oscillation of said oscillator to saturate said ignition coil core during the charging period of said storage device between signal inputs from said timing means.

6. The combination of claim 5 and further comprising:
a second charge storage device in series combination with second controlled rectifier, said series combination being in parallel with said first charge storage device, said second charge storage device being coupled between said second controlled rectifier and said reactor secondary winding to build up a charge on second storage device during oscillation of said oscillator between signal inputs from said timing means, said second storage device being dischargeable with said first charge storage device through said coil primary winding upon gating of said first controlled rectifier to thereby store energy in said coil from both of said charge storage devices for release to said coil secondary during a prolonged period and thereby extend spark duration.

7. The combination of claim 5 wherein:
said gating signal output means include a second secondary winding of said non-saturable reactor.

8. The combination of claim 5 wherein:
said transistor includes a Zener diode in parallel with said reactor primary, said gating signal output means including a conductor coupled to said Zener diode and energized by said reactor primary upon development of a voltage thereby exceeding Zener voltage.

9. The combination of claim 1 wherein said timing means include:
a unijunction transistor having a first base element coupled through a second charge storage device and a diode to said control signal input;
an emitter element coupled through first impedance means and a second diode to one side of an energy source;
said emitter being coupled through rapidly variable impedance means to the other side of said energy source;
said variable impedance means normally providing a low impedance path to said other side and clamping said emitter below firing voltage of said unijunction transistor;
a third charge storage device connected across said variable impedance means and chargeable by said source to firing voltage of said unijunction transistor upon transition of said variable impedance means to high impedance condition, said unijunction transistor thereupon charging said second charge storage device and applying a signal from said source through said second charge storage device to said control signal input for gating said controlled rectifier into conduction,
and a discharge path for said second charge storage device connected between said first base element and said other side of said energy source and including a third diode and third impedance means, said third impedance means being of sufficient value to prevent excessively rapid discharge of said second storage device and thereby avoid undesired spurious gating of said rectifier.

10. The combination of claim 9 wherein:
said variable impedance means are a rotary capacitor.

11. The combination of claim 9 wherein:
said variable impedance means include the load circuit path of a third transistor, and a rotary magnetic pulse generator in the control circuit of said third transistor.

12. The combination of claim 1 wherein:
said timing means includes a rotary magnetic pulse generator having an output coil coupled through a second charge storage device and a diode to said control signal input.

13. The combination of claim 1 wherein:
said timing means include a second secondary winding of said reactor coupled through a diode and a rotary capacitor to said control signal input.

14. The combination of claim 1 and further comprising:
a spark discharge device coupled through distributor means to said coil secondary winding and coupled to said timing means for synchronization therewith.

References Cited

UNITED STATES PATENTS

| | | | |
|---|---|---|---|
| 2,353,527 | 7/1944 | Touceda et al. | 315—209 |
| 3,217,216 | 11/1965 | Dotto | 317—250 |
| 3,334,619 | 8/1967 | Penn | 123—148 |
| 3,383,555 | 5/1968 | Minks | 315—209 |
| 3,383,556 | 5/1968 | Tarter | 315—209 |

FOREIGN PATENTS 564,529  2/1968  Belgium.

JOHN W. HUCKERT, *Primary Examiner.*

SIMON BRODER, *Assistant Examiner.*

U.S. Cl. X.R.

317—235